US007583445B2

United States Patent
Ichikawa

(10) Patent No.: US 7,583,445 B2
(45) Date of Patent: Sep. 1, 2009

(54) HEAD MOUNT DISPLAY APPARATUS

(75) Inventor: Tsutomu Ichikawa, Sakai (JP)

(73) Assignee: Konica Minolta Holdings, Inc., Tokyo (JP)

( * ) Notice: Subject to any disclaimer, the term of this patent is extended or adjusted under 35 U.S.C. 154(b) by 158 days.

(21) Appl. No.: 11/713,149

(22) Filed: Mar. 2, 2007

(65) Prior Publication Data

US 2007/0217017 A1  Sep. 20, 2007

(30) Foreign Application Priority Data

Mar. 9, 2006  (JP) .............................. 2006-063856

(51) Int. Cl.
 G02B 27/14 (2006.01)
 G02B 23/08 (2006.01)
 G09G 5/00 (2006.01)
(52) U.S. Cl. ............................. 359/630; 359/404; 345/7
(58) Field of Classification Search ......... 359/629–639, 359/404, 407, 409–410, 618–619, 625; 345/7–9; 631/633, 640; 351/41–176
See application file for complete search history.

(56) References Cited

U.S. PATENT DOCUMENTS 6,474,809 B2  11/2002 Tanijiri et al. ................. 351/41

2006/0268421 A1 *  11/2006 Shimizu et al. ............. 359/630

FOREIGN PATENT DOCUMENTS

JP  2002-156600 A  5/2002

* cited by examiner

Primary Examiner—Scott J Sugarman
Assistant Examiner—Dawayne A Pinkney
(74) Attorney, Agent, or Firm—Sidley Austin LLP

(57) ABSTRACT

A head mount display apparatus includes display section; eyepiece optical member for guiding light from display section to eyeball of wearer of the apparatus; and support substrate for supporting eyepiece optical member, support substrate being formed in a shape corresponding to outer shape of edge surfaces of eyepiece optical member and integrated with eyepiece optical member. Herein, edge surfaces of eyepiece optical member include plural slant surfaces in contact with support substrate. The plural slant surfaces include: light reflecting slant surface for reflecting light from display section toward eyeball of wearer, formed such as to be closer to an optical axis, as farther from an eyepiece surface and closer to surface opposite to eyepiece surface; and slant surface, other than reflecting slant surface, formed such as to be farther from the optical axis, as farther from eyepiece surface and closer to surface opposite to eyepiece surface.

20 Claims, 6 Drawing Sheets

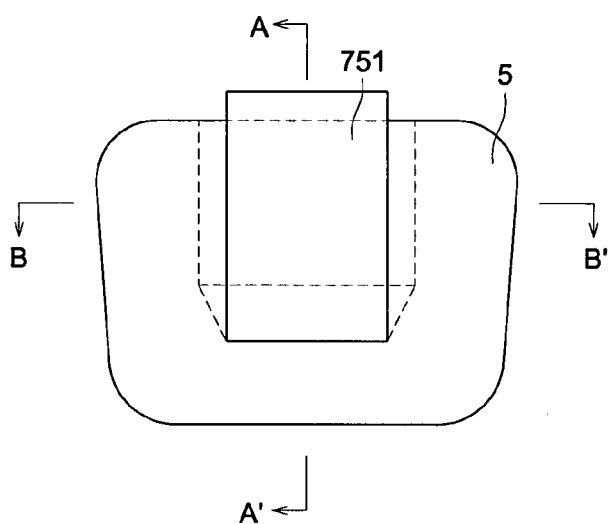
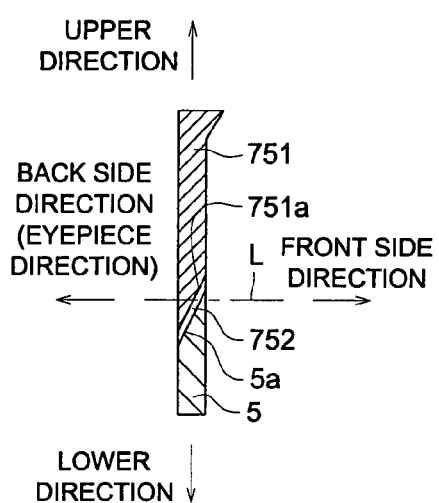
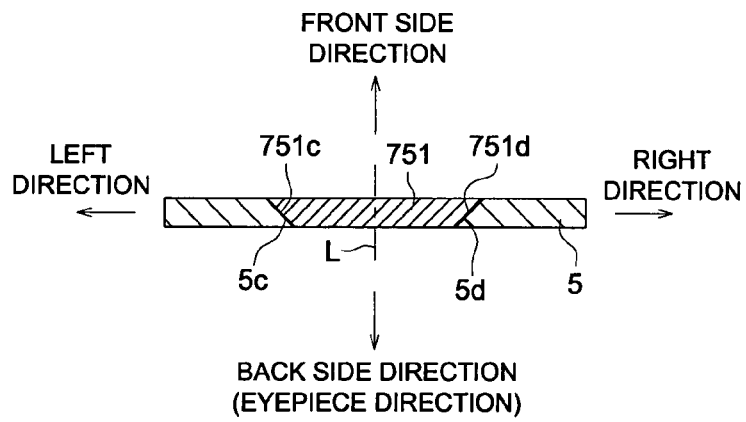

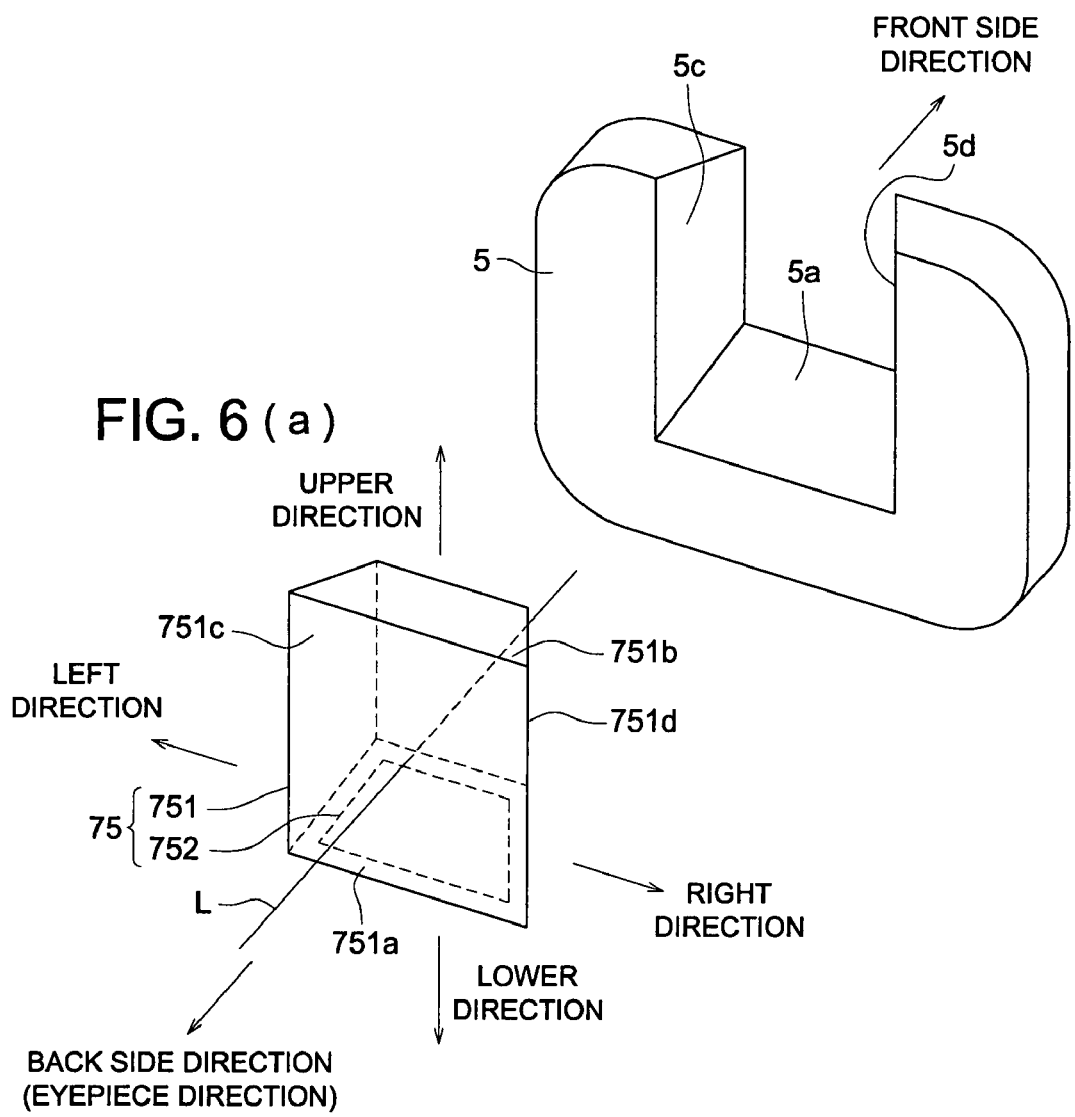

HEAD MOUNT DISPLAY APPARATUS

This application is based on Japanese Patent Application No. 2006-063856 filed on Mar. 9, 2006, in Japanese Patent Office, the entire content of which is hereby incorporated by reference.

FIELD OF THE INVENTION

This invention relates to a display apparatus, an particularly relates to a head mount display apparatus.

BACKGROUND OF THE INVENTION

In recent years, head mount display apparatuses, namely a HMD (Head Mount Display) used for watching contents images, such as movies and video, and remote control of industrial apparatuses and medical apparatuses have been developed.

In general, a HMD includes an eyepiece optical system for guiding an image obtained by the display element, such as a liquid crystal display and an organic EL, to the eyeball/eyeballs of a wearer of the HMD. The HMD allows the wearer of the HMD to watch a virtual image as if the image is magnified and displayed in the air by directly projecting the image obtained by the display element onto the eyeball/eyeballs of the wearer of the HMD.

For example, Japanese Patent Publication TOKKAI No. 2002-156600 discloses the technology of HMD including an eyepiece optical system configured by an optical substrate, onto the slant surface of the one end of which a hologram element is adhered as a reflective film for superimposing the image onto the front sight to display the image obtained by the display element, and a transparent plate shaped substrate, which supports the eyepiece optical system in the vicinity of the eyeball such as to face the eyeball. The structure of the eyepiece optical system and the support substrate disclosed in Japanese Patent Publication TOKKAI No. 2002-156600 will be briefly described by referring to FIG. 6(a) hereinafter. FIG. 6(a) illustrates a perspective view of the eyepiece optical system viewed obliquely from the right rear. FIG. 6(b) illustrates the support substrate viewed obliquely from the right rear. In the present specification, when wearing the HDM, the direction to the place where the eyeball is present, namely the direction toward the eyeball, is referred to as a back direction (an eyepiece direction) and the direction to the place where the image can be observed is referred to as a front direction.

As shown in FIG. 6(a), an eyepiece optical system 75 includes a prism 751, which is an optical substrate and a hologram element 752 (hereinafter, referred to as HOE (Holographic Optical Element)).

The surface on the lower side and the both side surfaces of the outer shape of the prism 751 are formed as the joint surfaces to be joined with the recessed cutout of the support substrate 5 when engaged with the recessed cutout, which will be described later. A slant surface 751a, onto which the HOE 752 is adhered, is formed to be the joint surface on the lower side of the prism 751. This slant surface 751a is formed such that the slant surface 751a has an inclination angle, which can guide a hologram image to the eyeball, when wearing the HMD. Further, the joint surfaces being the left and right side surfaces of the prism 751, are respectively formed to be slant surfaces 751c and 751d. The slant surface 751a slants upward from the edge thereof adjacent to the back surface (in the eyepiece direction) of the prism 751 toward the edge thereof adjacent to the front surface of the prim 751 (in the front direction). The slant surfaces 751c and 751d are located at a position off the optical axis L and are inclined with respect to the optical axis L, wherein the direction of inclination of the slant surfaces 751c and 751d are oriented such that the edges of the slant surfaces 751c and 751d adjacent to the front surface of the prism 751 are closer to the axis L than the edges of the slant surfaces 751c and 751d adjacent to the back surface of the prism 751. As described above, the slant surfaces 751a, 751c and 751d slant such that the outer shape of the prism 751 perpendicular to the axis L is smaller, as the outer shape is farther from the back surface and closer to the front surface of the prism 751.

Next, as illustrated in FIG. 6(b), a recessed cutout corresponding to the joint surfaces of the outer shape of the prism 751 is provided in the center portion of the support substrate 5. The recessed cutout is structured by slant surfaces 5a, 5c and 5d such as to respectively join with the slant surfaces 751a, 751c and 751d of the prism 751. As described above, the shape of the recessed cutout of the support substrate 5 is shaped corresponding to the outer shape of the prism 751.

The outer shape of the prism 751 is adhered to the support substrate 5 at the corresponding surfaces by adhesive agent, as described above, and integrated.

There have been studied various types of HMD having an eyepiece optical system and support substrate for supporting the eyepiece optical system such that the eyepiece optical system faces an eyeball, with a structure for guiding a image obtained from a display element such as a liquid crystal display or an organic EL to the eyeball of the wearer of the HMD and displaying it.

Since an eyepiece optical system is placed in the vicinity of an eyeball of the wearer of a HMD and is used facing the eyeball, the safety of the eyepiece optical system has to be secured. However, in the HMD disclosed in Japanese Patent Publication TOKKAI No. 2002-156600, three joint surfaces (slant surfaces 751a, 751c and 751d of the prism 751 and slant surfaces 5a, 5c, and 5c of the support substrate 5), by which the prism 751 joins with the support substrate 5, slant such that the outer shape of the prism perpendicular to the optical axis is smaller, as the outer shape is farther from the back surface and closer to the front surface of the prism 751. Namely, the outer shape of the prism 751 is formed in a trapezoid having a back surface as a bottom surface of the trapezoid. With this structure, it is difficult to stably place and join the prism 751 with the support substrate 5. Accordingly, when an impact is applied to the HMD, there is a possibility that the prism 751 is peeled off or drop off from the support substrate 5. Accordingly, it is necessary to consider the safety of the wearer of the HMD. However, the description about the improvement of the adhesive strength of the prism 751 to the support substrate 5 and the description about the attention to the safety of the HMD for the wearer of the HMD, are not disclosed nor suggested in Japanese Patent Publication TOKKAI No. 2002-156600.

To solve problems, as described above, an object of the present invention is to provide a durable head mount display apparatus having an eyepiece optical system and a support substrate for supporting the eyepiece optical system in the vicinity of an eyeball of a wearer who wears the head mount display apparatus such that the eyepiece optical system faces the eyeball of the wearer, wherein the eyepiece optical system is prevented from dropping from the support substrate and the head mount display apparatus is excellent in durability.

SUMMARY OF THE INVENTION

An object as described above can be attained by the invention including the item 1 and item 2 below.

1. A head mount display apparatus comprising:
a display section for displaying an image;
   an eyepiece optical member for guiding light from the display section to an eyeball of a wearer of the head mount display apparatus to provide the image displayed on the display section; and
   a support substrate for supporting the eyepiece optical member such that the eyepiece optical member faces the eyeball, in a vicinity of the eyeball of the wearer, the support substrate being formed in a shape corresponding to an outer shape of edge surfaces of the eyepiece optical member and integrated with the eyepiece optical member;
   wherein the edge surfaces of the eyepiece optical member include a plurality of slant surfaces in contact with the support substrate; and
   wherein the plurality of slant surfaces include:
   a light reflecting slant surface for reflecting the light from the display section into a direction of the eyeball of the wearer, the light reflecting slant surface being inclined with respect to the optical axis, a direction of inclination of the light reflecting slant surface being oriented such that an edge of the light reflecting slant surface adjacent to a surface opposite to the eyepiece surface is closer to the optical axis than an edge of the light reflecting slant surface adjacent to the eyepiece surface; and
   a slant surface other than the reflecting slant surface, the slant surface being inclined with respect to the optical axis, a direction of inclination of the slant surface being oriented such that an edge of the slant surface adjacent to the surface opposite to the eyepiece surface is farther from the optical axis than an edge of the slant surface adjacent to the eyepiece surface.

2. A head mount display apparatus comprising:
a display section for displaying an image;
   an eyepiece optical member for guiding light from the display section to an eyeball of a wearer of the head mount display apparatus to provide the image displayed on the display section; and
   a support substrate for supporting the eyepiece optical member such that the eyepiece optical member faces the eyeball, in a vicinity of the eyeball of the wearer, the support substrate being formed in a shape corresponding to an outer shape of edge surfaces of the eyepiece optical member and integrated with the eyepiece optical member,
   wherein the edge surfaces of the eyepiece optical member includes a plurality of slant surfaces in contact with the support substrate; and
   wherein each of the plurality of slant surfaces is inclined with respect to the optical axis, a direction of inclination of the slant surface being oriented such that an edge of the slant surface adjacent to a surface opposite to the eyepiece surface is either closer to or farther from the optical axis than an edge of the slant surface adjacent to the eyepiece surface.

BRIEF DESCRIPTION OF THE DRAWINGS

FIGS. 4(a)-4(c) illustrate a cross sectional view of the connection structure of the eyepiece optical system and the transparent substrate of the HMD of the present invention.

FIGS. 6(a) and 6(b) illustrate a perspective view of the outer shapes of the eyepiece optical system and a transparent substrate of a conventional HMD.

DETAILED DESCRIPTION OF THE PREFERRED EMBODIMENTS

A HMD (Head Mount Display), which is a typical embodiment of a head mount display apparatus of the present invention, will be described by referring to drawings hereinafter.

Figure 1A:
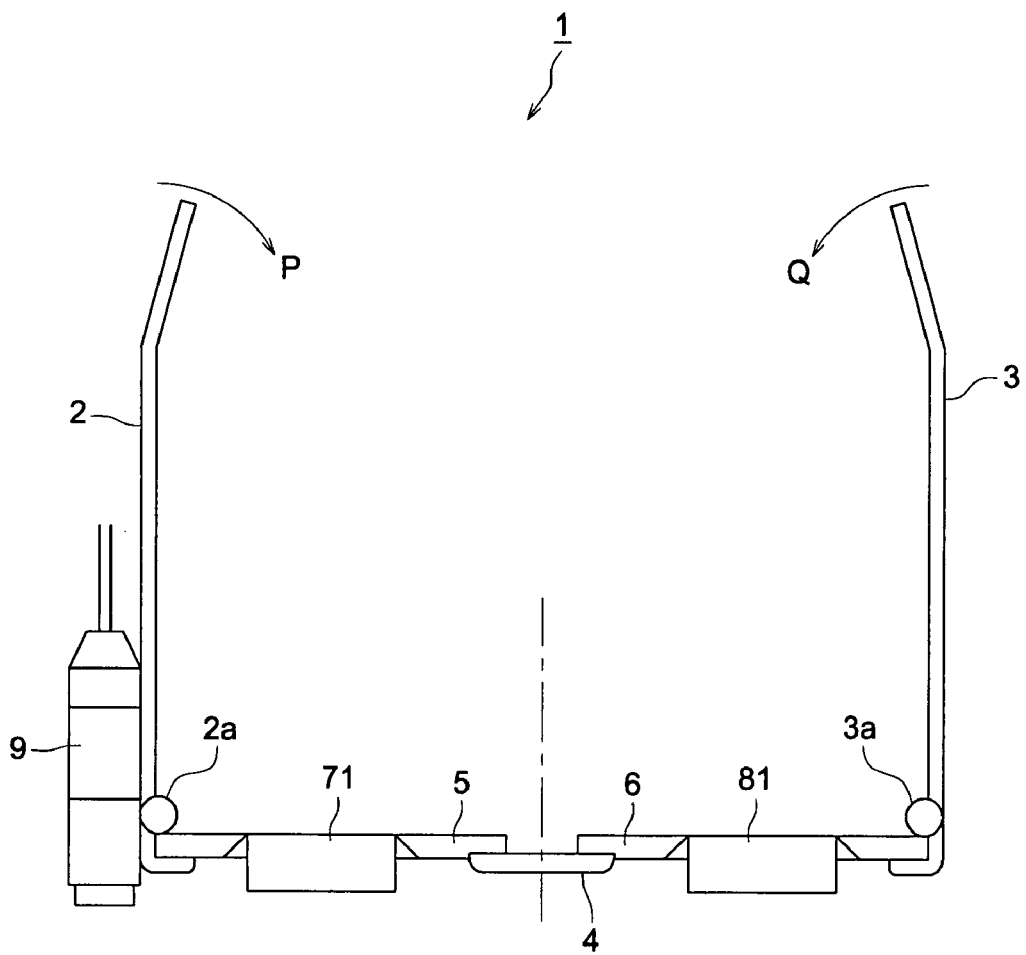
FIGS. 1(a) and 1(b) illustrate an external view of a HMD of the present invention.
Figure 1B:
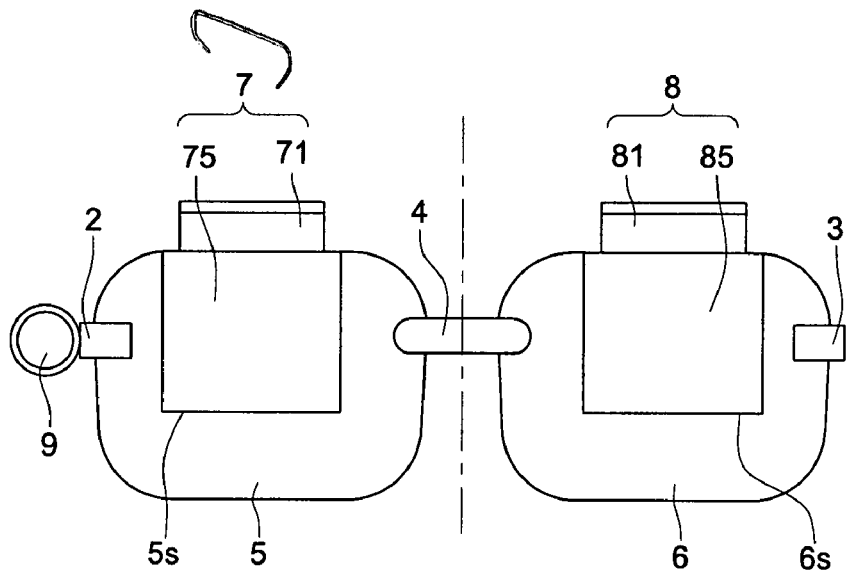

Firstly, the external view of HMD 1 will be described by referring to FIG. 1. FIG. 1(a) illustrates a plan view of the HMD 1 of the present invention. FIG. 1(b) illustrates a front view of the HMD 1 of the present invention.

The HMD 1 is a head mount display apparatus, which is placed in the vicinity of the eyeball of the wearer of the head mount display apparatus, and used by the wearer. As illustrated in FIG. 1(a), the HMD 1 includes frames 2 and 3, a bridge 4, transparent substrates 5 and 6, display units 7 and 8 and a camera unit 9. The display units 7 and 8 display an image photographed by the camera unit 9, or image contents of a video or television, which has been inputted through an external I/F (not shown).

The frames 2 and 3 are longitudinal members structured by an elastic material having flexibility. The frames 2 and 3 are designed to hang on the-ears or the side head portion of the wearer who wears the HDM1, so as to hold the HDM1 on the head of the wearer and adjust the wearing position. The frames 2 and 3 are structured such as to freely rotate in the arrow directions P and Q around rotation sections 2a and 3a. When the HMD 1 is not used, the HMD 1 can be made compact by swinging the frames 2 and 3 in the arrow directions P and Q to be along the transparent substrate 5 and 6, which will be described later.

The bridge 4 is a short bar member bridged between facing positions on the transparent substrates 5 and 6. The bridge 4 is designed to keep a constant distance between the transparent substrates 5 and 6, in a relative position relationship having a constant distance.

The transparent substrates 5 and 6 are support substrates in accordance with the present invention. The transparent substrates 5 and 6 are transparent members having a shape of substantially flat plate having U-shaped spaces 5s and 6s on the positions corresponding to the left and right eyeballs. Further, eyepiece optical systems 75 and 85, described later, are inserted in the respective U-shaped spaces 5s and 6s surrounded by the transparent substrates 5 and 6.

The display units 7 and 8 respectively include LCD display sections 71 and 81, which will be described later and eyepiece optical systems 75 and 85. The display units 7 and 8 display the image photographed by the camera unit 9, which will be described later, and the content image inputted from, for example, a video or a television via the external I/F.

The camera unit 9 includes a lens (not shown), a CCD (Charge Coupled Device) and an image processing section, which picks up image of an external sight around the wearer of the HMD. The CCD converts the optical image of a subject, which has been formed by the lens, into electric signals to generate image signals. The image processing section applies a predetermined image processing to the image signals to generate an image.

In the structure illustrated in FIG. 1, the display units 7 and 8 are respectively provided on the left front surface of the HMD 1 and the right front surface of the HMD 1. However, either one of the display units 7 and 8 may be provided instead of two display units.

Figure 2:
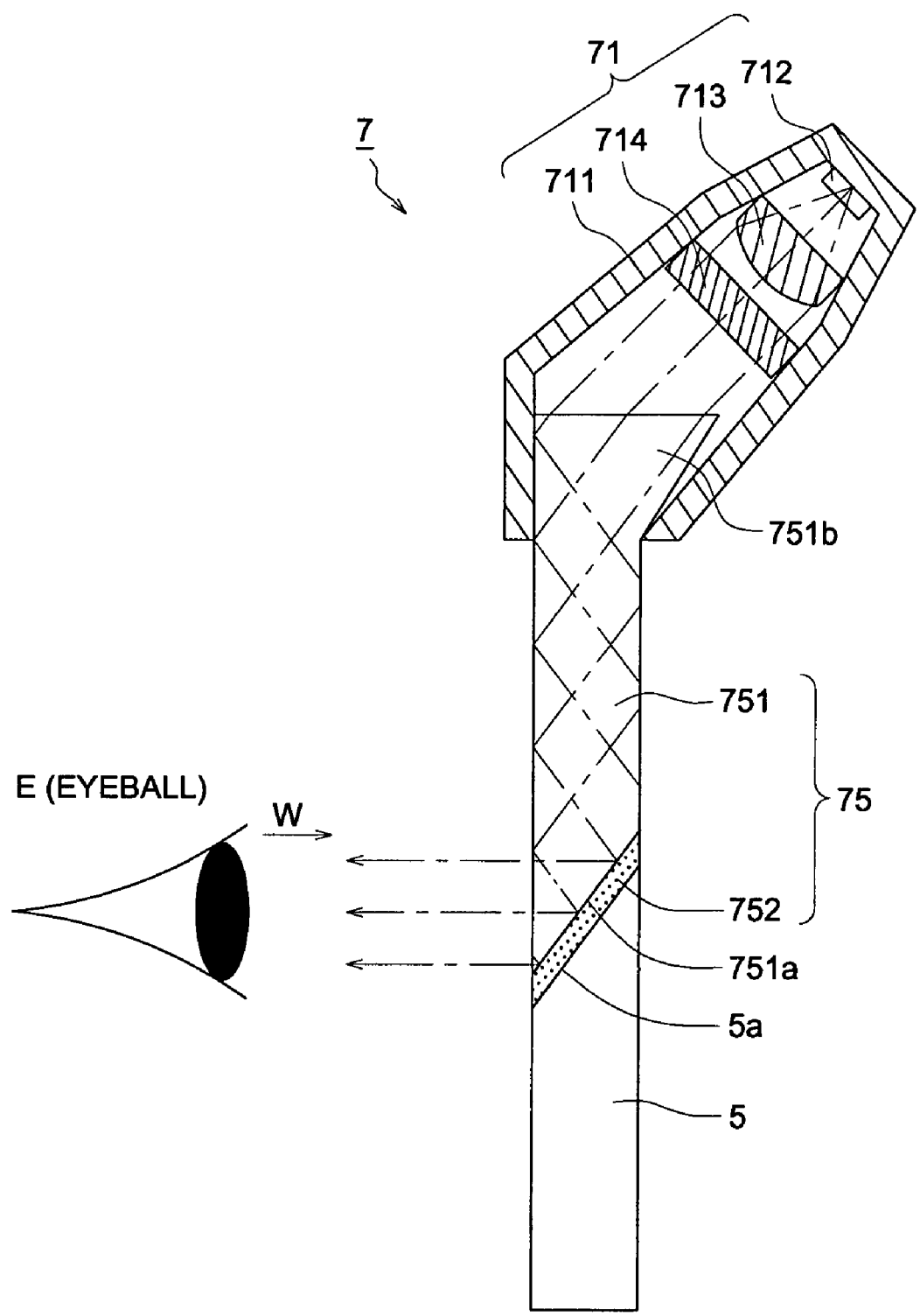
FIG. 2 illustrates a side-cross sectional view of the display unit of the HMD of the present invention.

Next, the structure of the display unit 7 will be described by referring to FIG. 2. FIG. 2 illustrates a side cross sectional view from the left side surface of the display unit 7 of the HMD 1 of the present invention, which mainly shows the internal structure of the display unit 7. With respect to the display unit 8, since it is the same structure as the display unit 7, the explanation will be omitted.

As illustrated in FIG. 2, the display unit 7 has a LCD display section 71 including a housing 711, a LED (Light Emitting Diode) 712, a collimator lens 713 and a LCD (Liquid Crystal Display) 714, and an eyepiece optical system 75 including a HOE (Holographic Optical Element) 752 and a prism 751.

In a state where the LED 712, the collimator lens 713 and the LCD 714 are included in the housing 711 of the LCD display section 71, the housing 711 is attached to the upper portion of the prism 751 of the eyepiece optical system 75 such that the housing 711 is stuck out in the upper-slant-front direction (in the FIG. 2, in the right-slant-upper direction).

The LED 712 is a point light source configured by a white light emitting diode (LED) including a predetermined wavelength color.

The collimator lens 713 forms the light beams from the LED 712 into substantially parallel light beams and projects them to the LCD 714.

The LCD 714 is a display section in accordance with the present invention. The LCD 714 generates an image based on an image signal generated by the camera unit 9, or a content image signal of, for example, video and television, which are inputted from the external I/F. The LCD 714 is, for example, a transmittable liquid crystal display panel.

The prism 751 is a transparent member having a substantially plate shape structured by glass or transparent resin. The prism 751 is designed to internally reflect a light beam from the LCD 714 plural times. The upper edge portion of the prism 751 is shaped in a wedge-shape (a thick section 751b) such as to be thick toward the upper side and to be stuck toward the front side (opposite to the eyepiece surface) so that almost all light beams from the LCD 714 can be guided inside the prism 751.

A slant surface 751a is formed at the lower end of the prism 751. The prism 751 is joined (for example, adhered) to the slant surface 5a formed on the transparent substrate 5 through the HOE 752. Each of the front surface and the back surface, namely the eyepiece surface, of the prism 751 forms a single surface continuous with the front or back surface of the transparent substrate 5. Thus, the prism 751 can be integrated with the transparent substrate 5 into a single plate shape.

The HOE 752 is a volume phase type hologram optical element having positive power and formed by an optically axial asymmetric free curved surface. The HOE 752 is supported with a predetermined slant angle at the lower end of the prism 751. The HOE 752 provides the eyeball E with hologram image by using optical interference phenomenon caused by irradiation of the light beams guided through the prism 751.

In the display unit 7 having the structure described above, the light beams emitted from the LED 712 pass through the collimator lens 713 and irradiate the LCD 714. The light-beam-image generated in the LCD 714 based on the light beams guided to the LCD 714 is totally reflected several times in the prism 751, diffracted by the HOE 752 and guided to the eyeball of the wearer of the HMD 1 as a virtual image.

Further, the prism 751 is designed to guide the light beams inputted from the front direction to the eyeball of the wearer of the HMD 1. Based on the structure described above, since the wearer of the HMD 1 can see the outside sight (the front subject) through the prism 751 (see-through), the wearer of the HMD 1 can see the image photographed by the camera unit 9, superimposed on the outside sight (the front subject).

The slant surface 5a formed on the transparent substrate 5 cancels the refraction of the light beams on the slant surface 751a of the prism 751. Namely, since the prism effect on the slant surface 751a prevents the light beams from the arrow sign W side from reflecting upward, a wearer of the HMD 1 can observe the outside lights without distortion through the prism 751, the transparent substrate 5 and HOE 752.

In the structure of the HMD 1 described above, in accordance with the present invention, the joint surface between the eyepiece optical system 75 and the transparent substrate 5 is formed so that the eyepiece optical system 75 does not drop off toward the eyeball of the wearer of the HMD 1 when the joint between the eyepiece optical system 75 and the transparent substrate 5 fails.

Figure 3:
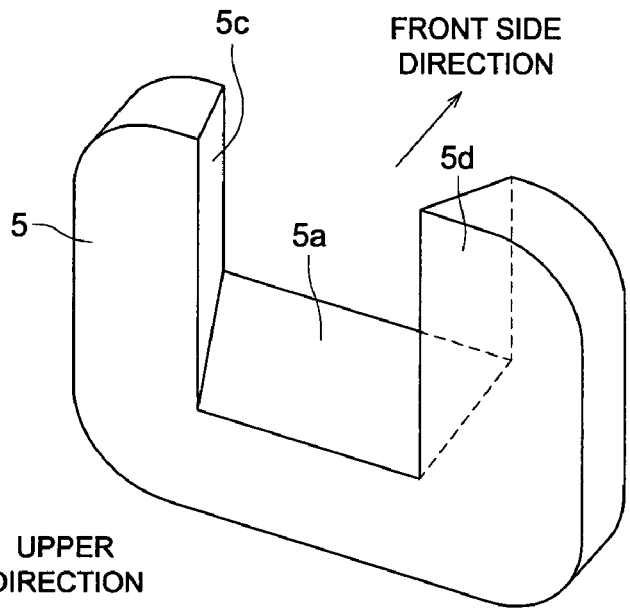
FIGS. 3(a) and 3(b) illustrate a perspective view of the outer shapes of the eyepiece optical system and a transparent substrate of the HMD of the present invention.
Figure 3:
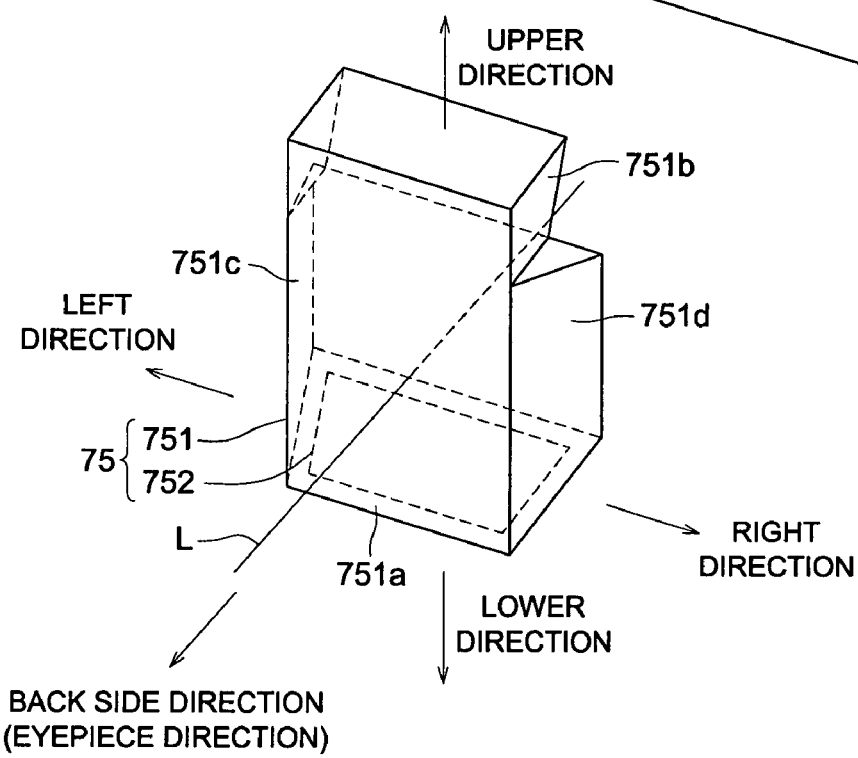

Hereinafter, the outer shapes of the eyepiece optical system 75 and the transparent substrate 5 will be described by referring to FIG. 3. FIG. 3(a) illustrates a perspective view of the eyepiece optical system 75 viewed obliquely from the right rear. FIG. 3(b) illustrates the transparent substrate 5 viewed obliquely from the right rear. In the present specification, when wearing the HDM, the direction to the place where the eyeball is present, namely the direction toward the eyeball, is referred to as the back direction (an eyepiece direction) and the direction to the place where the image can be observed is referred to as the front direction.

As illustrated in FIG. 3(a), the eyepiece optical system 75 includes a prism 751 and a hologram element 752 (hereinafter, it will be referred to as HOE; Holographic Optical Element).

The surface on the lower side of the outer shape of the prism 751 and the both side surfaces in the both side directions of the prism 751 are formed as the joint surfaces, the joint surfaces being joined with the recessed cutout of the transparent support substrate 5 when engaged with the recessed cutout, which will be described later. A slant surface 751a, onto which the HOE 752 is adhered, is formed as the joint surface on the lower side of the prism 751. This slant surface 751a is formed such that the slant angle of the slant surface 751a is set so as to guide the hologram image to the eyeball, when the user wears the HMD. Further, as the joint surfaces on the left and right sides of the prism 751, slant surfaces 751c and 751d are respectively formed, and a thick section 751b is formed at the top of the prism 751. The slant surface 751a slants upward from the back direction (eyepiece direction) to the front direction. The slant surfaces 751c and 751d slant are located at a position off the optical axis L and are inclined with respect to the optical axis L, wherein the direction of inclination of the slant surfaces 751c and 751d are oriented such that the edges of the slant surfaces 751c and 751d adjacent to the front surface of the prism 751 are farther from the axis L (on the left and right) than the edges of the slant surfaces 751c and 751d adjacent to the back surface (in the eyepiece direction) of the prism 751.

As described above, the slant surfaces 751c and 751d formed as the joint surfaces on the left and right sides of the prism 75 slant such that the outside shape of the prism 751 perpendicular to the axis L is larger as the outer shape is farther from the back surface (eyepiece direction) and closer to the front surface of the prism 751.

As illustrated in FIG. 3(b), a recessed cutout corresponding to the joint surfaces of the outer shape of the prism 751 is provided in the center portion of the transparent substrate 5. The recessed cutout is formed by slant surfaces 5a, 5c and 5d so that the surfaces respectively join with the slant surfaces 751a, 751c and 751d of the prism 751. As described above, the shape of the recessed cutout of the transparent substrate 5 is shaped corresponding to the outer shape of the prism 751.

The outer shape of the prism 751 is adhered to the transparent substrate 5 at the corresponding surfaces by adhesive agent, as described above, and integrated.

Next, the state where the prism 751 having the outer shape as described above is integrated with the transparent substrate 5 will be described by referring to the FIG. 4. FIG. 4(a) illustrates a back side view showing the state where the prism 751 is integrated with the transparent substrate 5. FIG. 4(b) illustrates a side cross-sectional view from the AA' direction in a state where the prism 751 is integrated with the transparent substrate 5 in the FIG. 4(a). FIG. 4(c) illustrates a plan-cross sectional viewed from the BB' direction in a state where the prism 751 is integrated with the transparent substrate 5 in the FIG. 4(a).

The slant surface 751a slants upward from the back direction (the eyepiece direction) to the front direction and joins with the slant surface 5a formed on the transparent substrate 5, through the HOE 75.

As illustrated in FIG. 4(c), the slant surfaces 751c and 751d on the left and right sides of the prism 751 are located at a position off the optical axis L and are inclined with respect to the optical axis L, wherein the direction of inclination of the slant surfaces 751c and 751d are oriented such that the edges of the slant surfaces 751c and 751d adjacent to the front surface of the prism 751 are farther from the axis L (on the left and right) than the edges of the slant surfaces 751c and 751d adjacent to the back surface (in the eyepiece direction) of the prism 751. The slant surfaces 751c and 751d respectively join with the slant surfaces 5c and 5d.

As described above, in the HMD 1 of the present invention, the slant surfaces 751c and 751d being the edge surfaces on the left and right sides are formed such that the outer shape of the prism 751 perpendicular to the axis L is larger, as the outer shape is farther from the back surface and closer to the front surface of the prism 751. Accordingly, when the joint between the eyepiece optical system 75 and the transparent substrate 5 fails, the eyepiece optical system can be prevented from dropping toward the eyeball of the wearer of the HMD. As a result, the safety of the eyeballs of the wearer of the HMD can be secured.

Namely, according to the present invention, edge surfaces of an eyepiece optical system are formed to be slant surfaces so that the eyepiece optical system does not drop toward the eyeball of a wearer of the HMD. Accordingly, when the joint between the eyepiece optical system and the support substrate fails, the eyepiece optical system is prevented from dropping toward the eyeball of the wearer of the HMD. As a result, the safety of the eyeball/eyeballs of the wearer of the HMD can be secured.

The slant edge surfaces of the outer shape on the left and right sides of the eyepiece optical system are formed at a position off the optical axis perpendicular to the eyepiece surface and are inclined with respect to the optical axis, wherein the direction of inclination of the slant surfaces are oriented such that the edges of the slant surfaces adjacent to the front surface of the eyepiece optical system are farther from the axis than the edges of the slant surfaces adjacent to the back surface of the eyepiece optical system. Namely, the slant edge surfaces of the outer shape on the left and right sides of the eyepiece optical system are formed such that the outer shape of the eyepiece optical system perpendicular to the optical axis is larger, as the outer shape is farther from the eyepiece surface and closer to the surface opposite to the eyepiece surface. Accordingly, when the joint between the eyepiece optical system and the transparent substrate fails, the eyepiece optical system can be prevented from dropping toward the eyeball of the wearer of the HMD.

Figure 5:
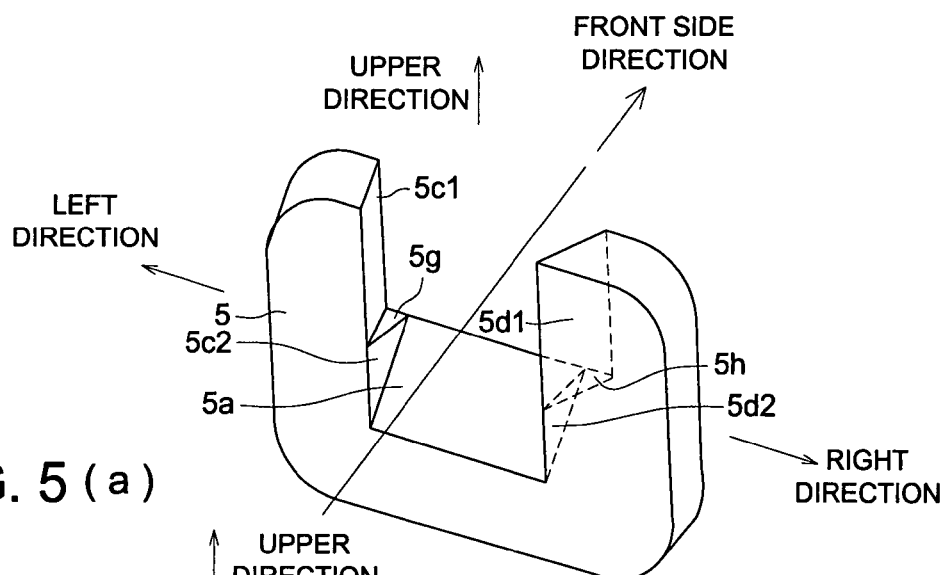
FIGS. 5(a) and 5(b) illustrate a perspective view of another example of the eyepiece optical system of the HMD of the present invention.
Figure 5:
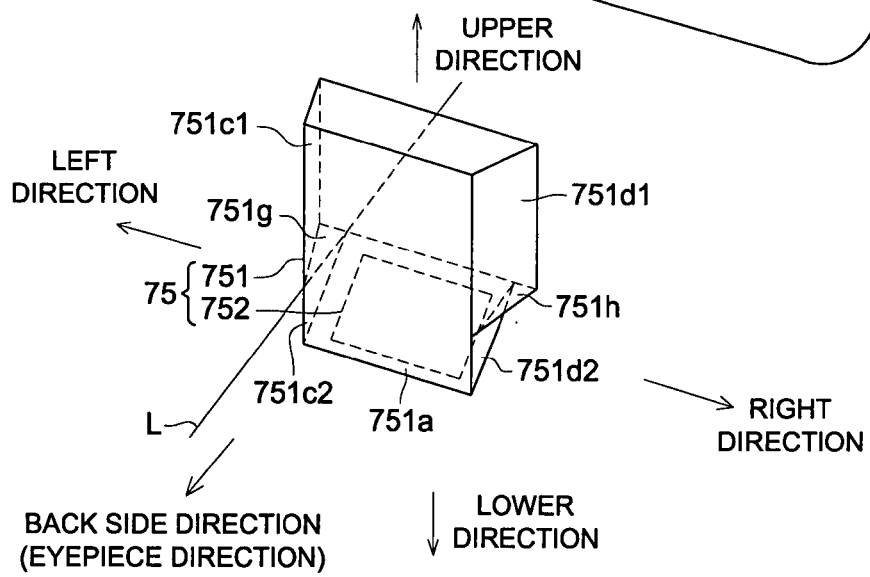

Although the invention is described herein with reference to the preferred embodiment, one skilled in the art will readily appreciate that various modifications and variations may be made without departing from the spirit and scope of the present invention. For example, as shown in FIG. 5, it is possible to divide the recessed cutout of the transparent substrate into an upper portion and a lower portion, to form lower direction side surfaces 5c2 and 5d2, which are parallel to the optical axis L, and upper surfaces 5c1 and 5d1, which are located at a position off the optical axis perpendicular to the eyepiece surface of an eyepiece optical system 751 and are inclined with respect to the optical axis, wherein the direction of inclination of the upper surfaces 5c1 and 5d1 are oriented such that the edges of the upper surfaces 5c1 and 5d1 adjacent to the front surface of the eyepiece optical system are farther from the axis (on the left and right) than the edges of the upper surfaces 5c1 and 5d1 adjacent to the eyepiece surface of the eyepiece optical system.

As shown in FIG. 5(b), in the center portion of the transparent substrate 5, the recessed cutout is formed corresponding to the joint surfaces of the outer shape of the prism 751. This recessed cutout has slant surfaces 5a, 5c2, 5g, 5c1, 5d2, 5h and 5d1 such that they can join with corresponding joint surfaces 751a, 751c2, 751g, 751c1, 751d2, 751h and 751d of the prism 751. As described above, the recessed cutout of the transparent substrate 5 is formed corresponding to the outer shape of the prism 751 (in FIG. 5(b), the thick section 751b as shown in FIG. 3 is not shown).

When the joint between the eyepiece optical system 751 and the transparent substrate 5 fails, this structure described above can prevent the eyepiece optical system 751 from dropping toward the eyeball of the wearer of the HMD. At the same time, it is possible to divide a mold for manufacturing the transparent substrate 5 by the plane including the boundary surfaces 5g and 5h between the upper and lower sides of the recessed cutout. As a result, it is possible to simplify the structure of the mold, and the cost can be reduced.

What is claimed is:

1. A head mount display apparatus comprising:
   a display section for displaying an image thereon;
   an eyepiece optical member for guiding light from the display section to an eyeball of a wearer of the head mount display apparatus to provide the wearer with the image displayed on the display section, the eyepiece optical member including on edge surfaces thereof:
   a first slant surface at which the light from the display section is to be reflected in a direction toward the eyeball of the wearer, and
   a second slant surface other than the first slant surface; and
   a support substrate for supporting the eyepiece optical member such that an eyepiece surface of the eyepiece optical member faces the eyeball in a vicinity of the eyeball of the wearer, the support substrate being formed, integrally with the eyepiece optical member and in contact with the first slant surface and the second slant surface, in a shape fitting into a shape of a part of the edge surfaces of the eyepiece optical member;

wherein the first slant surface is inclined with respect to an optical axis perpendicular to the eyepiece surface and is facing in a direction opposite to a direction toward the eyepiece surface, and the second slant surface is arranged to face in a direction toward the eyepiece surface.

2. The head mount display apparatus of claim 1, wherein an HOE is arranged on the first slant surface.

3. The head mount display apparatus of claim 1, wherein the eyepiece optical member is integrated with the support substrate by adhesion.

4. The head mount display apparatus of claim 1, wherein the support substrate is transparent.

5. The head mount display apparatus of claim 1, wherein the eyepiece optical member comprises a thick section for introducing thereinto the light from the display section.

6. The head mount display apparatus of claim 5, wherein the support substrate is provided with an opening section facing upward in a state where the wearer wears the head mount display apparatus and the thick section sticks out from the opening section.

7. The head mount display apparatus of claim 1, wherein a part of the second slant surface is formed to be slanted so as to face in a direction opposite to a direction toward the eyepiece surface.

8. The head mount display apparatus of claim 7, wherein the part of the second slant surface is located in a vicinity of the first slant surface.

9. The head mount display apparatus of claim 1, wherein the apparatus is provided with a pair of the display sections, a pair of the eyepiece optical members, and a pair of the support substrates.

10. A head mount display apparatus comprising:
a display section for displaying an image thereon;
an eyepiece optical member for guiding light from the display section to an eyeball of a wearer of the head mount display apparatus to provide the wearer with the image displayed on the display section, the eyepiece optical member including on edge surfaces thereof:
    a first slant surface which is provided to be inclined with respect to an optical axis perpendicular to an eyepiece surface of the eyepiece optical member, and
    a second slant surface, other than the first slant surface, which is provided to be inclined with respect to the optical axis; and
a support substrate for supporting the eyepiece optical member such that the eyepiece surface of the eyepiece optical member faces the eyeball in a vicinity of the eyeball of the wearer, the support substrate being formed, integrally with the eyepiece optical member and in contact with the first slant surface and the second slant surface, in a shape fitting into a shape of a part of the edge surfaces of the eyepiece optical member, wherein the first slant surface is oriented to face in a direction opposite to a direction toward the eyepiece surface, and the second slant surface is oriented to face in a direction toward the eyepiece surface.

11. The head mount display apparatus of claim 10, wherein the eyepiece optical member is integrated with the support substrate by adhesion.

12. The head mount display apparatus of claim 10, wherein the support substrate is transparent.

13. The head mount display apparatus of claim 10, wherein the eyepiece optical member comprises a thick section for introducing therein the light from the display section.

14. The head mount display apparatus of claim 13, wherein the support substrate is provided with an opening section facing upward in a state where the wearer wears the head mount display apparatus and the thick section sticks out from the opening section.

15. The head mount display apparatus of claim 10, wherein the first slant surface is for reflecting the light from the display section into a direction toward the eyeball of the wearer.

16. The head mount display apparatus of claim 10, wherein the second slant surface includes therein a third slant surface which is arranged to face in a direction opposite to a direction toward the eyepiece surface.

17. The head mount display apparatus of claim 15, wherein an HOE is arranged on the first slant surface.

18. The head mount display apparatus of claim 15, wherein the second slant surface includes therein a third slant surface which is arranged to face in a direction opposite to a direction toward the eyepiece surface.

19. The head mount display apparatus of claim 18, wherein the third slant surface is provided in a vicinity of the first slant surface.

20. A head mount display apparatus comprising:
a display mechanism for displaying an image;
an eyepiece optical element for guiding light from the display mechanism to an eye of a wearer of the head mount display apparatus; and
a support substrate for supporting the eyepiece optical member, the support substrate having a cutout configured to receive at least a portion of the eyepiece optical element therein;
wherein the eyepiece optical element includes a first edge slant surface that is in contact with the support substrate and which is beveled so as to guide an image from the display mechanism to the eye of the wearer and the eyepiece optical element includes a second edge slant surface that is in contact with the support substrate and which is beveled outwardly relative to the eye of the wearer.

* * * * *